Sept. 29, 1931. H. WOCHNER 1,825,436
AUTOMOBILE AXLE PRESS
Original Filed Dec. 21, 1928
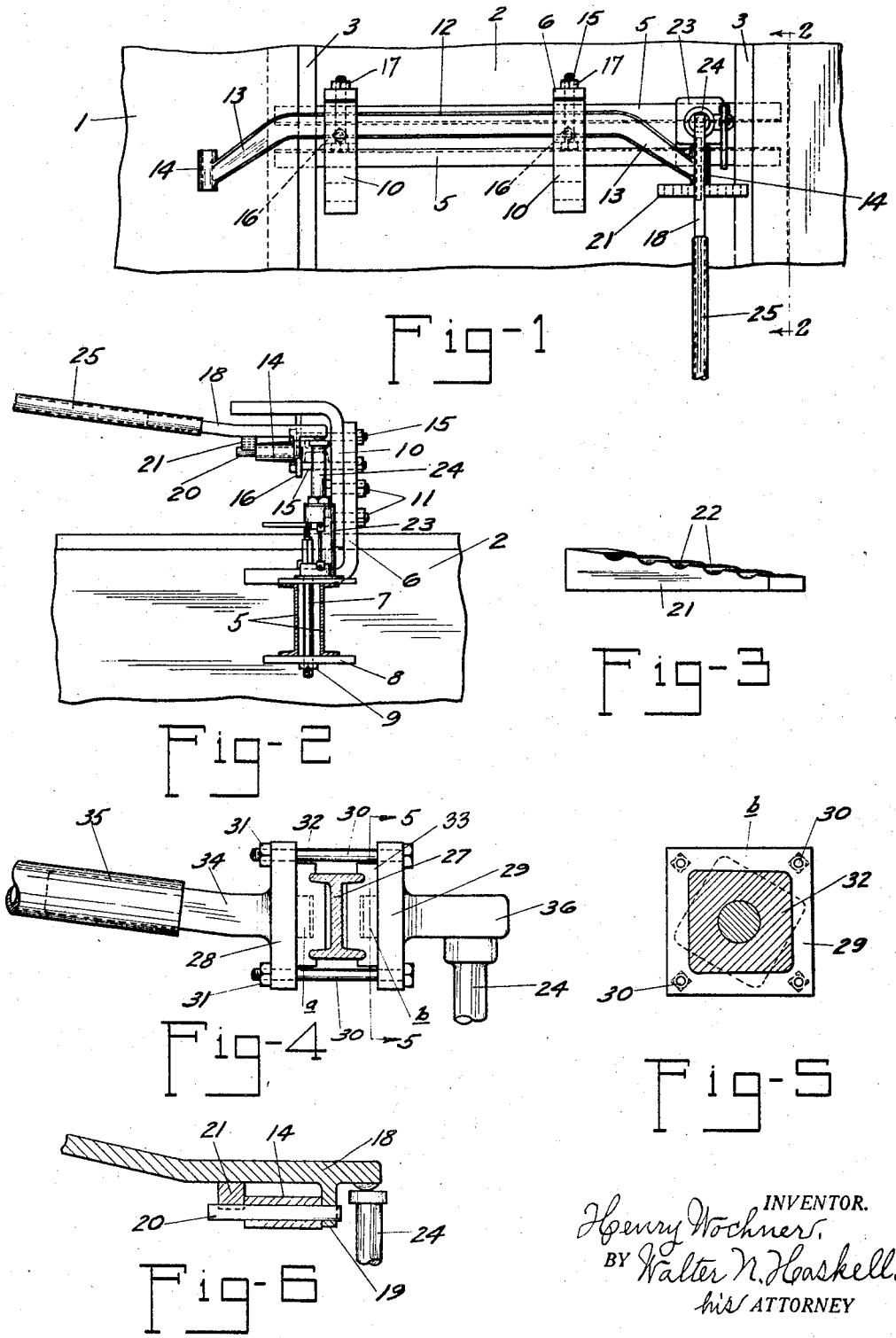

Patented Sept. 29, 1931

1,825,436

UNITED STATES PATENT OFFICE

HENRY WOCHNER, OF ROCK ISLAND, ILLINOIS, ASSIGNOR TO BEAR MANUFACTURING COMPANY, OF ROCK ISLAND, ILLINOIS, A CORPORATION

AUTOMOBILE AXLE PRESS

Original application filed December 21, 1928, Serial No. 327,643. Divided and this application filed February 17, 1930. Serial No. 428,983.

My invention has reference to a press for automobile axles, of a class set forth in my former application for Letters Patent of the United States filed December 21st, 1928, Serial No. 327,643, out of which the present application is divided. One of the fundamental features of the invention set forth in said former application was a pit or opening in the floor of sufficient depth for mechanics to work in, and a cross-beam rigidly secured in the side walls of the pit near the top thereof. The original invention had for its purpose to provide for the straightening of an axle in a vertical plane, whereas the present invention is more specially designed for assisting in taking the twist out of an axle. The invention is adaptable for use with a cross-beam of the character set forth in said former application, but is not limited to such use. It comprises one of several sets of tools by which various faults in an axle may be treated, and corrected.

The particular construction, arrangement and operation of the various parts of the invention will be more fully understood from the following specification, reference being had to the accompanying drawings, in which:—

Fig. 1 is a plan view showing the machine in position for taking the twist out of an axle.

Fig. 2 is a cross-section on the line 2—2 of Fig. 1.

Fig. 3 is a detail of the wedge 21, in perspective.

Fig. 4 is a cross-section of an axle with a modified form of clamp applied thereto.

Fig. 5 shows one of the clamp-plates on the line 5—5 of Fig. 4.

Fig. 6 is a detail in section of the bar 18 and appurtenant parts.

The invention is shown in Figures 1 and 2 of the drawings, in which the reference number 1 indicates the floor of a building, in which is a pit 2, provided with side walls 3, in which are anchored the ends of a cross-beam, formed of a pair of spaced channel-plates 5. Supported on said cross-beam is a pair of angle-plates 6, held in place by bolts 7, passing downwardly through the space between the plates 5 and through holes in anchor-plates 8, beneath which the threaded ends of the bolts are fitted with nuts 9. Fixed to the angle-plates 9 are angle-plates 10, by means of bolts 11 passing through openings in the upright portions of said angle-plates. The angle-plates form frames in the upper part of which is supported an axle 12, shown detached from a vehicle, and provided with the usual bent ends 13, at the ends of which are sleeves 14. The axle is held against the inner faces of the angle-plates 10 in a horizontal plane by means of bolts 15 passing through openings in said plate and in a plate 16 parallel with the plate 10. By means of nuts 17 on the ends of the bolts 15 the axle can be clamped tightly in place.

Connected with the sleeve 14 at one end of the axle is a bar 18, by means of an eye 19 depending therefrom, in which is held a pin 20, also passing through the sleeve. A bearing on the pin is afforded for the outer end of the bar by means of a wedge 21 provided with a series of stepped bearings 22, with one of which the pin 20 is engaged. Supported on the cross-beam 5—5 is a power jack 23, the rod 24 of which bears against the projecting end of the bar 18. The force of the jack tends to raise the inner end of the bar 18 and lower the outer end, which outer end is at the same time guided and held downwardly by the operator, by means of a pipe extension 25 on the end of said bar. By this means the end of the axle can be bent back into a true position, and the force can also be imparted to intermediate parts of the axle to make corrections therein.

In Figures 4 and 5 a somewhat similar device is shown which can be employed in straightening the axle 27, when there is a twist therein, in which the axle is supported in its normal position, and is secured to the clamp-plate 10 in any suitable manner, one such means being set forth in my companion application for Letters Patent of the United States filed February 7, 1930, Serial No. 426,549, for an automobile axle press.

At the sides of the axle are clamp-plates 28 and 29, united at their corners by bolts 30, held in place by nuts 31. A pair of blocks 32 and 33 have a trunnion connection with the plates 28 and 29, respectively, as at *a* and *b*, permitting said blocks to turn independently of the plates. The inner faces of the blocks conform in shape to the flanges of the axle. The plate 28 is fitted with a bar 34, having a pipe extension 35, and the plate 29 has an oppositely disposed projection 36, for engagement by the rod of the jack 23, the jack being positioned on the channel plates 5, as shown in Fig. 1. By the action of the jack a force is imparted to the plates 28 and 29 to twist the same back into a normal position, the operation being controlled somewhat and steadied by the bar 34, as in the former case. By tilting the blocks 32 and 33, as shown in Fig. 5 in dotted lines, they can be caused to engage the inclined ends of the axle, while the clamp-plates retain their horizontal position.

By means of the jack a sufficient amount of force may be applied to the axle to twist it without heating it, and in that respect the invention comprises one of several sets of tools which are designed for the correction of various faults in an axle without first subjecting the axle to heat, and usually without the necessity of removing the same from its place in the vehicle. Other devices of this group are set forth in the applications hereinbefore referred to.

While the invention has been set forth herein in its use in connection with an operator's pit and cross-beam set therein, it is not limited thereto, but can be employed in any place where a suitable support can be found for the angle-plate frames, such as a stationary rack above the ground, teeter-rack, and the like. Changes can also be made in the form and arrangement of the parts of the invention aside from those set out herein, without departing from the spirit of the invention. The angle-plates 6 and 10 can also be arranged for vertical adjustment of the latter plates, as set forth in said companion applications.

What I claim and desire to secure by Letters Patent, is:—

1. A press for automobile axles, comprising a beam held rigidly in place, a jack mounted on said beam axle supporting frames fixed to said beam, means for holding an axle rigidly on said frames, and a bar engageable with one end of such axle, and provided with an extension for engagement by the rod of a jack positioned on said beam.

2. A press for automobile axles, comprising a stationary beam, frames supported thereby provided with axle supports, means for holding an axle tightly on said supports, a bar provided with means for engagement with the sleeve on the end of an axle, provided with means for engagement with the rod of a jack, and means for controlling the action of said bar in operation.

3. A press for automobile axles, comprising a stationary beam, frames fixed to said beam and provided with axle supports, means for clamping an axle on said supports, a bar provided with a bearing, a pin connected with said bearing and adapted for insertion in a sleeve on the end of an axle supported on said frames to project beyond the same, a corrugated wedge insertable between said bar and the end of said pin, a handle for said bar, and an expansion element interposed between the end of said bar and said beam.

In testimony whereof I affix my signature.

HENRY WOCHNER.